United States Patent
Sato

[11] Patent Number: 6,055,061
[45] Date of Patent: Apr. 25, 2000

[54] CHARACTER IMAGE PROCESSING APPARATUS AND METHOD

[75] Inventor: Yukimasa Sato, Kawasaki, Japan

[73] Assignee: Canon Kabushiki Kaisha, Tokyo, Japan

[21] Appl. No.: 08/995,855

[22] Filed: Dec. 22, 1997

[30] Foreign Application Priority Data

Dec. 26, 1996 [JP] Japan .................................. 8-348850

[51] Int. Cl.[7] .................................................. G06K 15/00
[52] U.S. Cl. .......................................... 358/1.11; 358/1.2
[58] Field of Search .................................. 395/101, 102, 395/109, 110, 112, 113, 115, 117; 382/276, 286, 290–293, 295, 298, 301; 345/121, 124, 127–130, 144, 467, 468, 469, 471, 472; 358/1.1, 1.2, 1.9, 1.11, 1.13, 1.14, 1.16, 1.18

[56] References Cited

U.S. PATENT DOCUMENTS

| | | | |
|---|---|---|---|
| 4,686,525 | 8/1987 | Nagata | 345/195 |
| 5,167,013 | 11/1992 | Hube et al. | 395/110 |
| 5,185,818 | 2/1993 | Warnock | 382/112 |
| 5,577,184 | 11/1996 | Matoba | 345/472 |
| 5,668,935 | 9/1997 | Endo | 395/110 |
| 5,761,395 | 6/1998 | Miyazaki et al. | 395/110 |
| 5,768,490 | 6/1998 | Hersch et al. | 345/468 |
| 5,825,987 | 10/1998 | Asada | 395/110 |
| 5,859,648 | 1/1999 | Moore et al. | 345/471 |

*Primary Examiner*—Arthur G. Evans
*Attorney, Agent, or Firm*—Fitzpatrick, Cella, Harper & Scinto

[57] ABSTRACT

A character image processing apparatus so adapted that when a typeface and size are specified at generation of a character image, a font of a specific typeface and of a size within predetermined selection limits of a specified size is retrieved from pre-rasterized fonts already developed as bitmap data and stored. In a case where a character image is generated from this font, the character will be generated at a position offset from the position the character of the specified size would have originally occupied. Accordingly, position is corrected in such a manner that the center of the position which a character would have originally occupied and the position of the center of the character generated from the pre-rasterized font will coincide. Further, the selection limits are decided using sizes midway between a stored pre-rasterized font and character sizes one size larger and one size smaller than that of this pre-rasterized font as boundaries.

27 Claims, 14 Drawing Sheets

F I G. 1
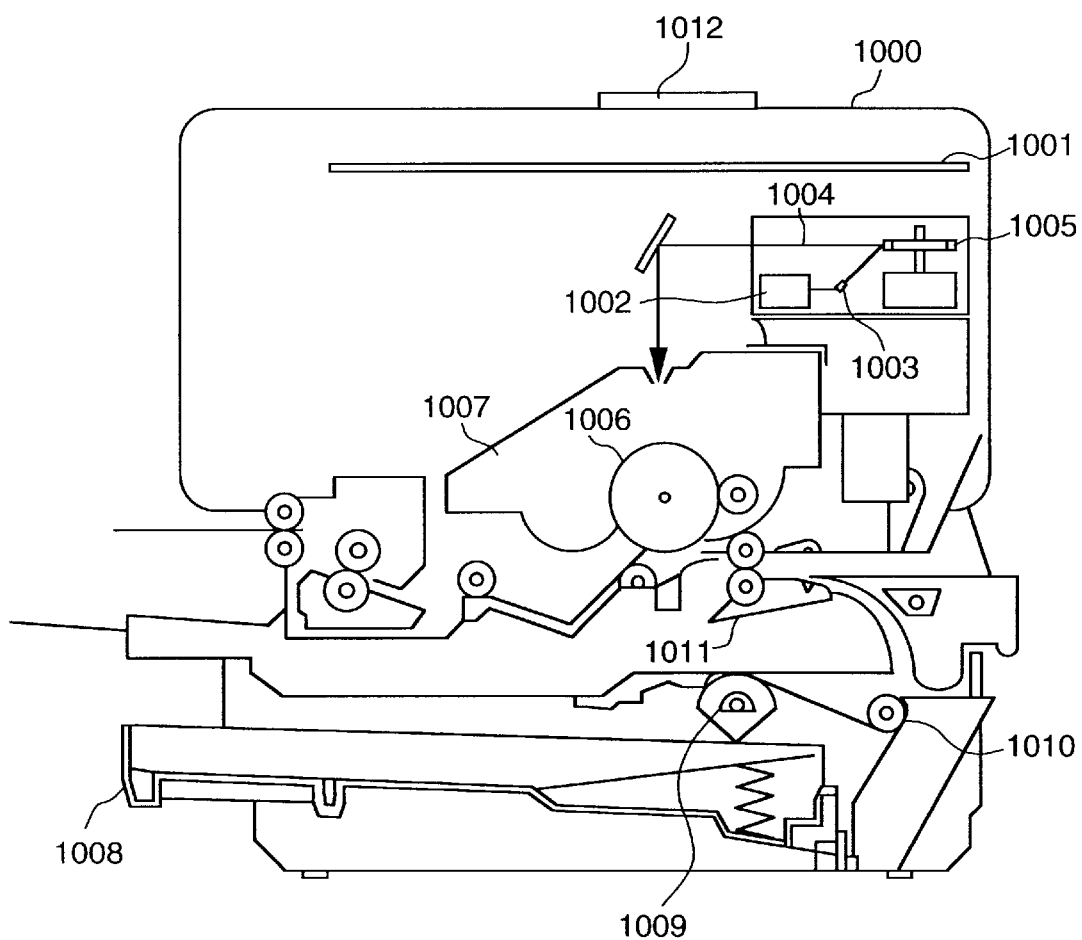

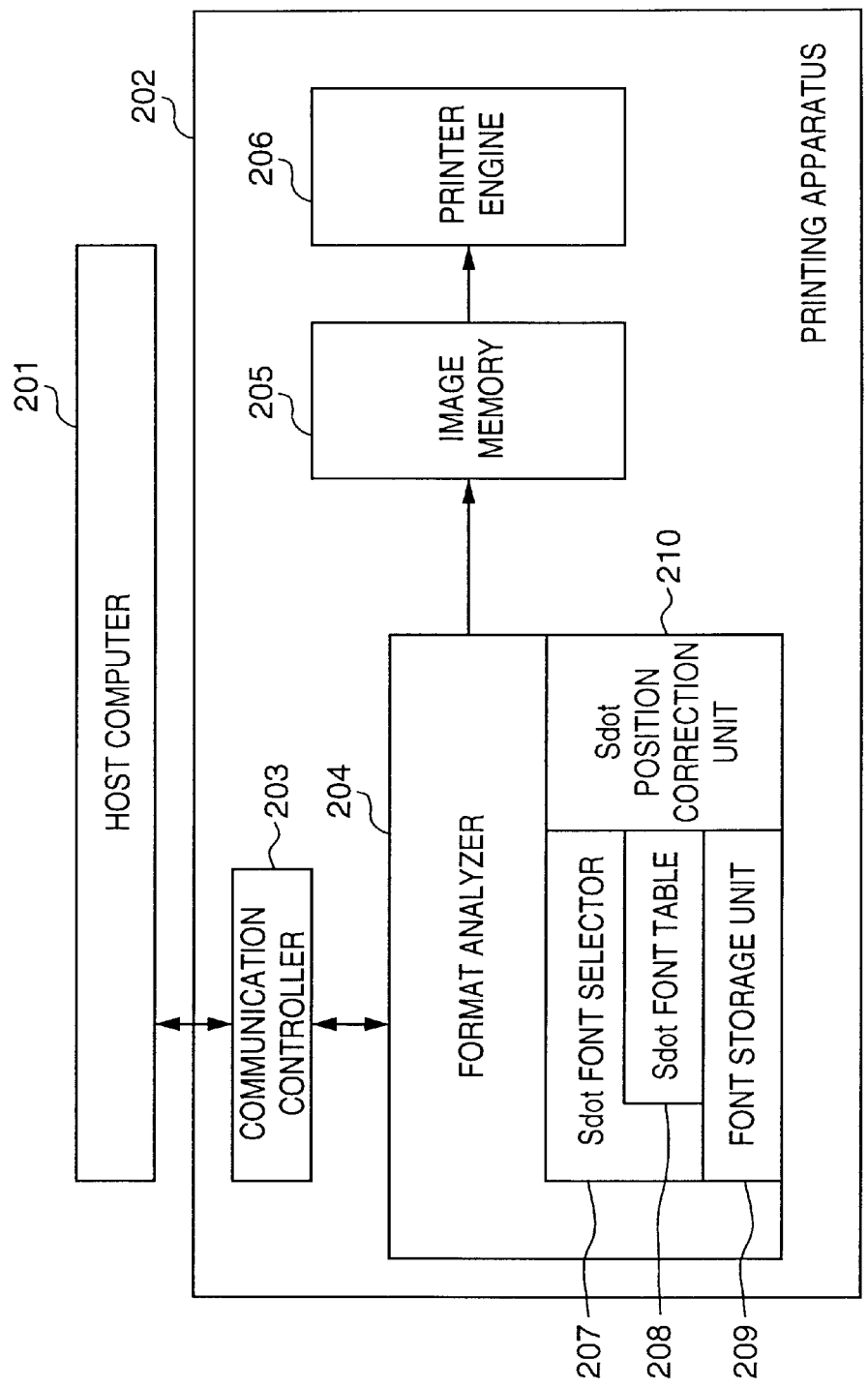

ORIGINAL PATTERN

LEFT OFFSET CHANGED TO LEFT
OFFSET OF SCALABLE FONT

ADD ( Wscl − Wdot ) / 2
TO LEFT OFFSET VALUE

| SCALABLE FONT NAME | POINT SIZE | SELECTION LIMITS | | Sdot FONT NAME |
|---|---|---|---|---|
| | | LOWER LIMIT | UPPER LIMIT | |
| Mincho - Medium | 8 | 7.8 | 9 | S8 - Medium |
| | 10 | 9 | 10.5 | S10 - Medium |
| | 11 | 10.5 | 11.2 | S11 - Medium |
| Gothic - Medium | 9 | 8.8 | 9.5 | S9 - Gothic |
| | 10 | 9.5 | 10.2 | S10 - Gothic |
| ⋮ | ⋮ | ⋮ | ⋮ | ⋮ |

FIG. 12

| | |
|---|---|
| FONT NAME | Mincho - Medium |
| CHARACTER SIZE | 10POINT |
| PITCH | 7.2CPI |
| GRAPHIC SET NO. | J90 |
| TYPEFACE | Mincho |
| STROKE WEIGHT | Medium |
| FONT STORAGE ADDRESS | |
| | |

CHARACTER IMAGE PROCESSING APPARATUS AND METHOD

BACKGROUND OF THE INVENTION

1. Field of the Invention

This invention relates to a character image processing apparatus having font data for outputting a character image in response to designation of a character code, and to a character image processing method.

2. Description of the Related Art

Printers currently in wide use have a memory for storing font data and, in response to designation of a character size, typeface and code, output the corresponding character image. Scalable fonts often are employed as the font data stored in the printer in advance. A scalable font enables a variety of sizes to be specified for a single typeface and makes it possible to output a character image of high quality. In order to speed up the development of character images, character images converted from the scalable fonts to bitmaps, i.e. pre-rasterized fonts, are stored in the printer permanently or temporarily in advance and are used together with the scalable fonts to output character images.

However, a pre-rasterized font is used only in a case where its typeface and size conform to a specified size and typeface. Thus, pre-rasterized fonts are not exploited satisfactorily. Consequently, typefaces and character sizes for which development of the character images is speeded up by using pre-rasterized font are limited to only some typefaces and sizes. Development at higher speed is not always achieved.

SUMMARY OF THE INVENTION

Accordingly, an object of the present invention is to provide a printing apparatus and a character image processing method in which, even if there is no pre-rasterized font that coincides with a specified size, a pre-rasterized font of a size close to the specified size is used to speed up printing processing.

Another object of the present invention is to provide a character image processing apparatus comprising storage means for storing pre-rasterized fonts developed as bitmap patterns, retrieval means for retrieving, from the pre-rasterized fonts stored by the storage means, a pre-rasterized font of a specified typeface and of a character size within predetermined selection limits of a specified character size, and generating means for generating a character image using the retrieved pre-rasterized font if retrieval by the retrieval means was successful.

Another object of the present invention is to provide a character image processing method comprising a retrieval step of retrieving, from pre-rasterized fonts developed as bitmap patterns and then stored, a pre-rasterized font of a specified typeface and of a character size within predetermined selection limits of a specified character size, and a generating step of generating a character image using the retrieved pre-rasterized font if retrieval by the retrieval step was successful.

Another object of the present invention is to provide a computer readable storage medium storing a character image processing program using pre-rasterized fonts developed as bitmap patterns and then stored, the program comprising a retrieval processing step of retrieving, from pre-rasterized fonts developed as bitmap patterns and then stored, a pre-rasterized font of a specified typeface and of a character size within predetermined selection limits of a specified character size, and a generating processing step of generating a character image using the retrieved pre-rasterized font if retrieval by the retrieval step was successful.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a art of the specification, illustrate embodiments of the invention and, together with the description, serve to explain the principles of the invention.

FIG. 1 is a sectional view of a laser printer;

FIG. 2 is a block diagram of a printing apparatus according to a first embodiment of the present invention;

FIG. 12 is a diagram showing an example of font information concerning an Sdot font in the first embodiment;

DESCRIPTION OF THE PREFERRED EMBODIMENTS

[First Embodiment]

Figure 3A:
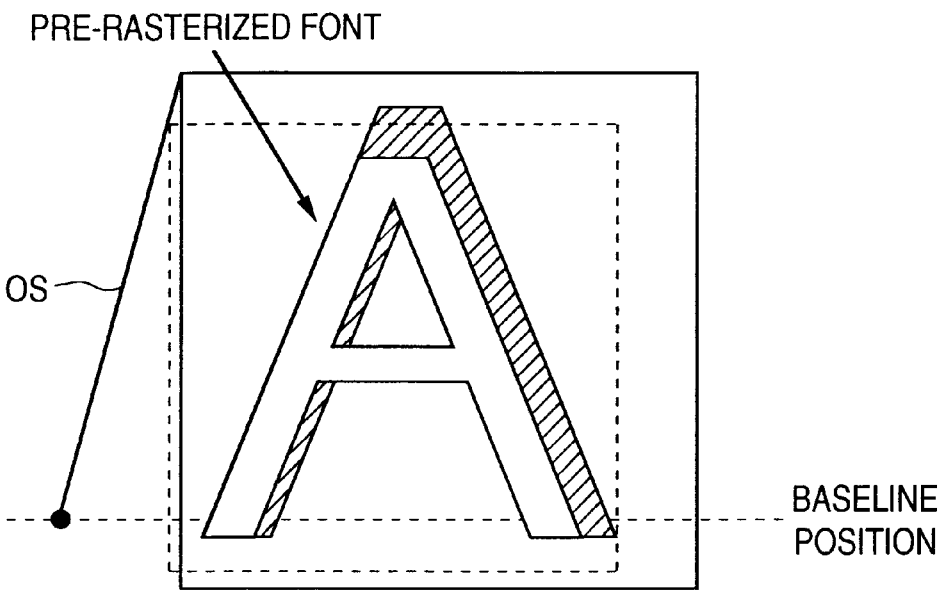
FIGS. 3A and 3B are diagrams showing the positional relationship between a pre-rasterized font and a scalable font.

FIG. 1 is a sectional view illustrating the internal structure of a laser printer 1000 according to the first embodiment of the present invention. The laser printer 1000 is so adapted as to register character patterns from a data source, not shown, or standard forms (form data). As shown in FIG. 1, the laser printer has a main body 100 for storing entered character information (character codes), form information or macro instructions, etc., supplied by an externally connected host computer (host computer 201 in FIG. 2), creating character patterns or form patterns, etc., in accordance with this information and forming the resulting images on recording paper serving as the recording medium. A control panel 1012 is provided with various operable switches and LED indicators. A printer control unit 1001 exercises overall control of the laser printer 1000 and analyzes character information provided by the host computer. The printer control unit 1001 primarily converts character information to a video signal of the corresponding character pattern and outputs the video signal to a laser driver 1002. In dependence upon the entered video signal, the laser driver 1002, which is a circuit for driving a semiconductor laser 1003, turns on and off a laser beam 1004 emitted by the semiconductor laser 1003. The laser beam 1004 is swept back and forth by a rotating polygonal mirror 1005 so as to scan an electrostatic rum 1006. As a result, an electrostatic latent image of a character pattern is formed on the electrostatic drum 1006. The latent image is developed by a developing unit 1007 surrounding the electrostatic drum 1006, after which the developed image is transferred to recording paper. Cut sheets are used as the recording paper and are stored in a paper cassette 1008 that has been loaded in the laser printer 1000. The recording paper is fed into the apparatus by a feed roller 1009 and conveyance rollers 1010, 1011 so as to be supplied to the electrostatic drum 1006.

FIG. 2 is a block diagram illustrating a printing apparatus according to the first embodiment. As shown in FIG. 2, a host computer 201 outputs printing information, which comprises font data and control data, to a printing apparatus 202. The latter corresponds to the printing apparatus 1000 shown in FIG. 1. The printing apparatus 202 comprises a communication controller 203, a format analyzer 204, an image memory 205 and a printer engine 206.

The communication controller 203 is for performing communication with the host computer 201.

Figure 13:
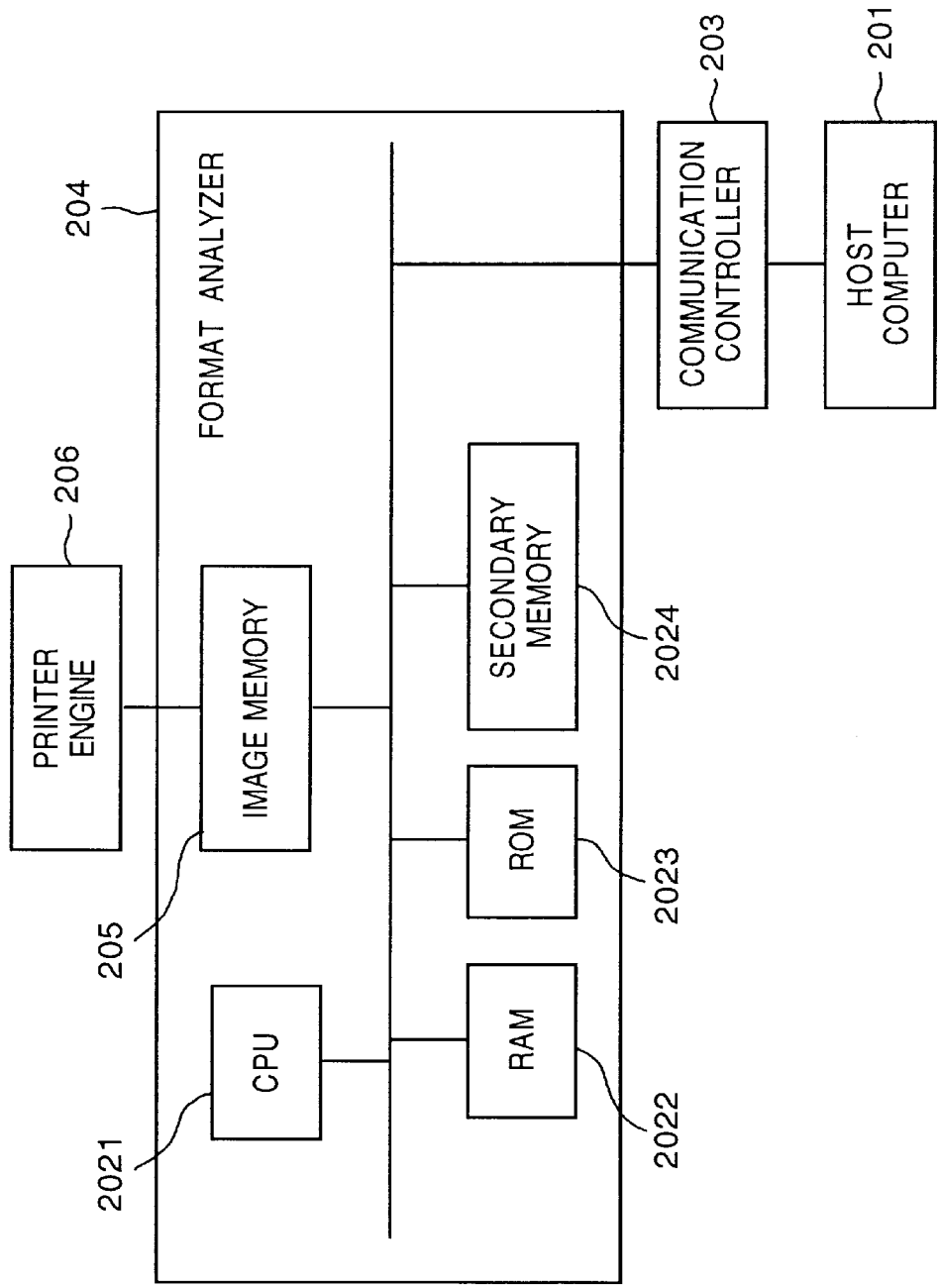
FIG. 13 is a block diagram for a case where a format analyzer is implemented by a CPU.

The format analyzer 204 executes processing to analyze printing information received from the host computer 201. The format analyzer 204 generates a print image and stores the image in the image memory 205, whence the image is sent to the printer engine 206. The format analyzer 204 includes an Sdot font selector 207, a font storage unit 209 and an Sdot position correction unit 210. It should be noted that format analyzer 204 can be constituted by a CPU, a RAM and a ROM, etc. and that the Sdot font selector 207, font storage unit 209 and Sdot position correction unit 210 can be implemented by having the CPU execute a program stored in the RAM or ROM, in which case the structure of the printing apparatus 202 would be as depicted in FIG. 13. Specifically, here the format analyzer 204 includes a CPU 2021, a RAM 2022, a ROM 2023 and a secondary memory 2024. The secondary memory 2024 may be a fixed disk or a removable floppy disk or ROM cassette capable of externally supplying data files and program files off-line. The secondary memory 2024 supplies the font data and programs executed by the CPU 2021.

The image memory 205 stores a print image created by the format analyzer 204 and transfers the image to the printer engine 206. The image memory 205 is constituted by a RAM.

The printer engine 206 has a printing function for forming the print image into a permanent image and in this embodiment is the laser printer shown in FIG. 1.

The Sdot font selector 207 serves as hit determination means for determining whether a specified character size conforms to an available size of a pre-rasterized font. The Sdot font selector 207 retrieves and selects, from an Sdot font table 208, a pre-rasterized font (also referred to as an "Sdot font" hereinafter) conforming to the designation of a character size in print data sent from the host computer. A table indicating the attributes of Sdot fonts among the fonts stored in the font storage unit 209 is stored in the Sdot font table 208 as Sdot font information. The stored font information includes character attributes, such as font size, and storage location, etc.

FIG. 12 is an example of Sdot font data stored in the Sdot font table 208. As shown in FIG. 12, the Sdot font table 208 possesses various information, such as font name, character size, pitch, graphic set number, typeface, stroke weight (character thickness) and font storage address. The Sdot font selector 207 obtains the size of each Sdot font from the font information that has been registered in the Sdot font table 208. The Sdot font selector 207 checks to determine whether a character size designated by the host computer falls within fixed limits (selection limits) of the character size of each Sdot font obtained. If an Sdot font within these limits exists, this Sdot font is selected. For example, consider a case where character sizes up to a character size of ±0.3 point of the character size of an Sdot font have been set as the selection limits. If a designated character size in the print data is 9.7 points to 10.3 points with respect to a 10-point Sdot font, then a 10-point Sdot font is selected. The Sdot font selector 207 includes the Sdot font table 208.

The font storage unit 209 stores font data and is constituted by a storage medium such as a ROM, RAM or hard disk, etc. The RAM 2022, ROM 2023 and secondary memory 2024 can be used as these storage media.

Figure 7:
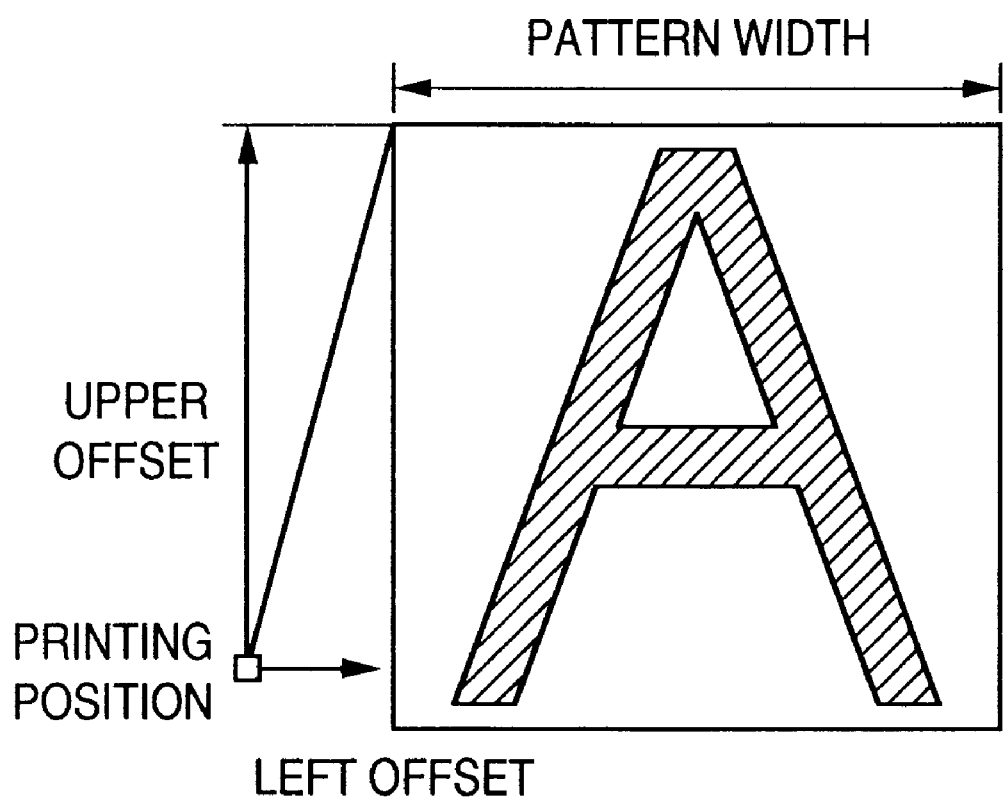
FIG. 7 is a diagram showing the relationship between a character pattern and offset.

The Sdot position correction unit 210 calculates offset of the pattern position from the scalable font of an Sdot font based upon the Sdot font information, the scalable font information and the character size, corrects the offset value of the Sdot font and delivers this value to the format analyzer 204. The correction is performed using the offset value in the scalable font and a difference in pattern width between the scalable font and the Sdot font. It should be noted that the offset value in this embodiment indicates the distance from a character reference position to the upper left-hand corner of the pattern, as illustrated in FIG. 7. Further, the component of the offset value in the x direction is represented by left offset, and the component of the offset value in the y direction is represented by upper offset. Further, left offset is taken as being positive if it is directed to the right. A line indicating that the upper offset is zero is referred to as a base line.

FIG. 3A illustrates an example of offset between the patterns of a scalable font and pre-rasterized font. Assume here that a font having a size within the selection limits of a designated size has been selected as a character "A" of a pre-rasterized font. In this case the selected character is so disposed that a position specified by an offset OS from the base line will be the reference position (upper left-hand corner) of the character pattern. This character image is developed. Consequently, if a comparison is made with a scalable font printed at the originally specified size, it will be seen that the offset of the font "A" of the specified size will be different from that of the pre-rasterized font "A" and therefore the positions of the two fonts will be offset from each other. In the example of FIG. 3A, the outline letter is the pre-rasterized font and the black letter is the original font. It will be understood that the position of the pre-rasterized font has been shifted leftward from the original font.

Figure 3B:
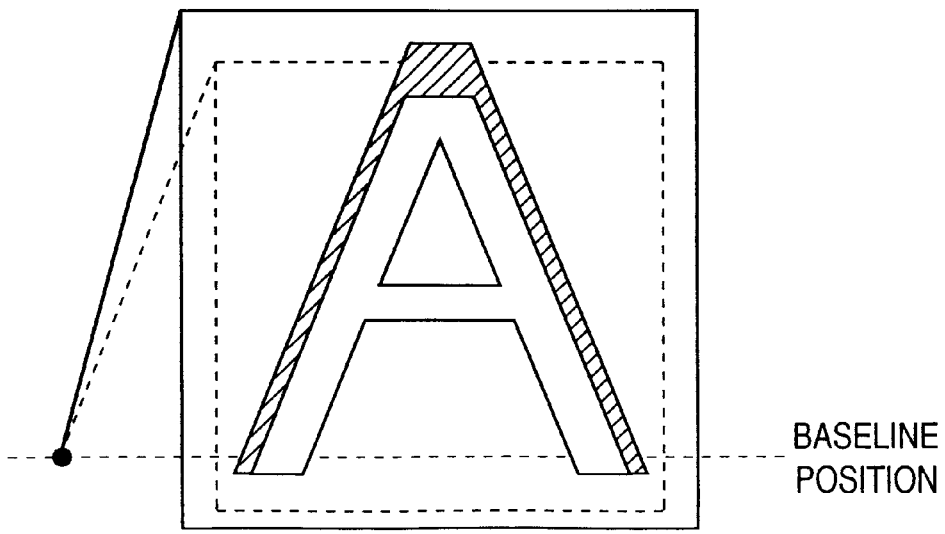

As shown in FIG. 3B, the offset of the pre-rasterized font is corrected by the Sdot position correction unit 210 so as to approach the position of the specified scalable font that was to be printed originally.

Figure 4:
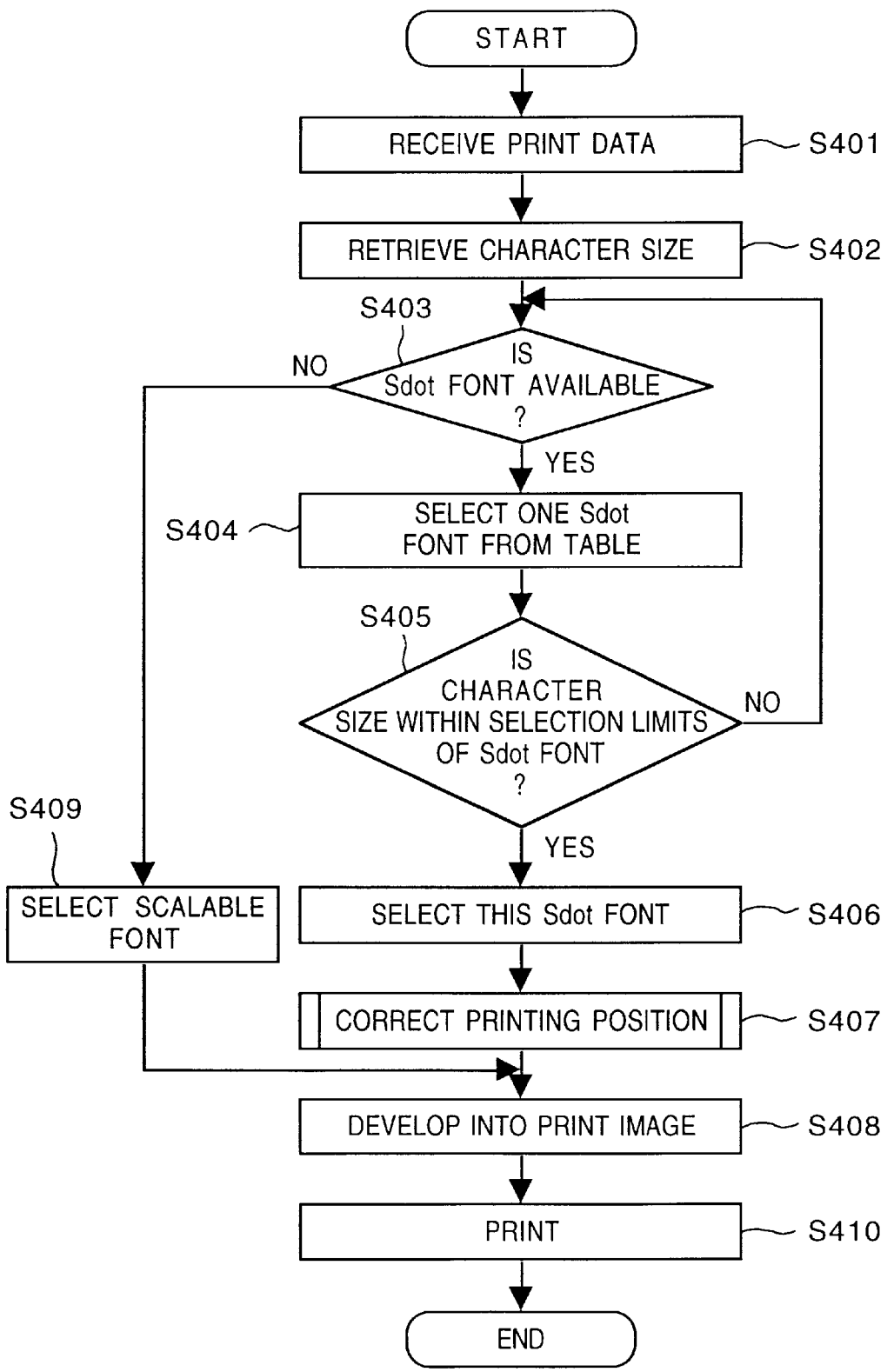
FIG. 4 is a flowchart of printing processing according to the first embodiment.

FIG. 4 is a flowchart of processing, executed by the printing apparatus 202, from reception of print data to selection and printing of a font. This flowchart can be be referred to as the procedure of a program executed by the CPU 2021 of FIG. 13.

First, the print data is received from the host computer 201 (S401).

Next, the format analyzer 204 analyzes the print data accepted from the host computer 201. If a scalable font has been specified, the format analyzer 204 delivers the specified font size to the Sdot font selector 207 to cause retrieval of the Sdot font (S402).

The Sdot font selector 207 goes to the Sdot font table 208 to retrieve Sdot fonts that correspond to the specified scalable font, namely the Sdot fonts for which the typeface and the like conform to the that specified. Whether conforming Sdot fonts exist in the results of retrieval is investigated (S403). If the Sdot fonts exist, information concerning each of these Sdot font is extracted from the Sdot font table 208 one item at a time as a candidate (S404).

Information relating to character size is read out of the extracted Sdot font information and the selection limits of this size are calculated. According to this embodiment, limits obtained by adding and subtracting 0.3 point to and from the character size of the Sdot font are adopted as the selection limits, and the size is compared with the character size specified by the print data (S4005).

If a character size specified by the print data exists within the selection limits, then this Sdot font is selected (S406).

The format analyzer 204 develops the print data into a print image using the Sdot font that has been selected. At this time the offset position is corrected by the Sdot position correction unit 210 in relation to the selected Sdot font (S407).

The character image is developed to create an output image in the image memory 205 (S408).

The printer engine 206 prints the print image that has been stored in the image memory 205 (S410).

In a case where the character size specified by the print data does not fall within the selection limits of the Sdot font selected as a candidate at step S404, information relating to the next Sdot font in the Sdot font table 208 is retrieved and the processing of steps S403~S405 is repeated.

If, after information relating to all Sdot fonts has been retrieved, no corresponding pre-rasterized font is found, then the scalable font is selected and the character pattern is generated from the scalable font (S409).

Figure 6A:
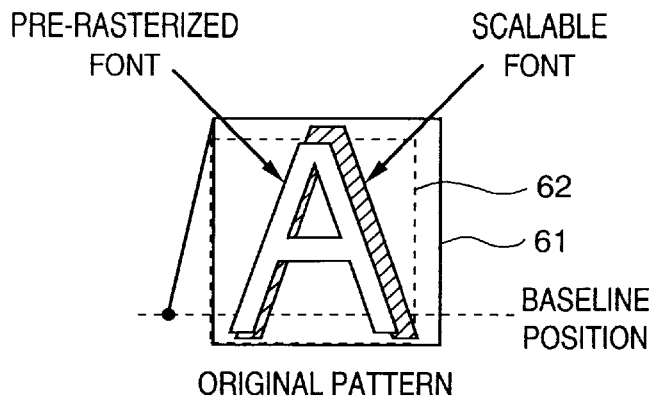
FIGS. 6A through 6C are conceptual views of processing for correcting printing position according to the first embodiment.
Figure 6B:
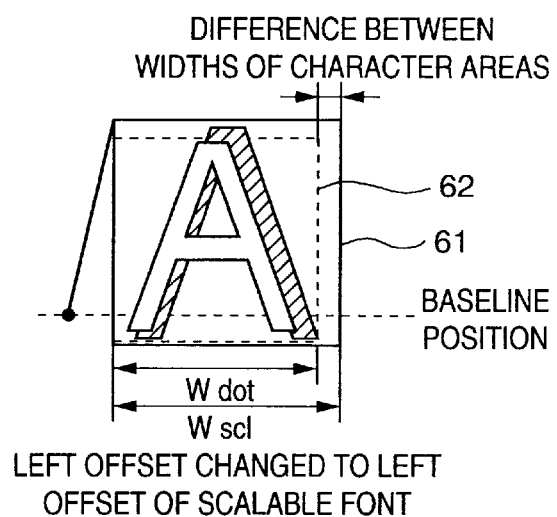
Figure 6C:
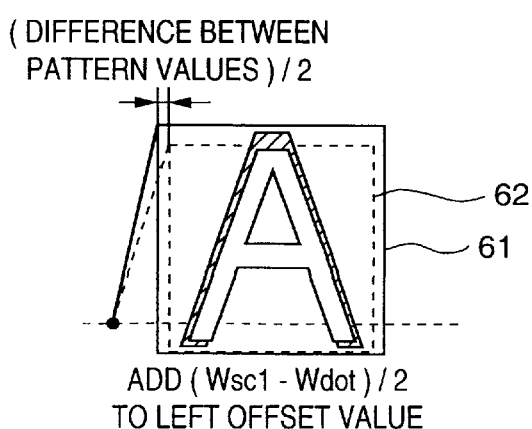

FIGS. 6A through 6C are conceptual views illustrating the manner in which position is corrected. FIG. 6A illustrates the positional relationship between a scalable font (the black letter) of a specified, size and an Sdot font (the outline letter) used for printing because it falls within the selection limits. The position of the scalable font is indicated by a character area 61 shown by the solid line, and the position of the pre-rasterized font is indicated by a character area 62 shown by the dotted line. FIG. 6B illustrates the manner in which the left offset of the Sdot font is made left offset of the scalable font. In this case the left-side boundaries of the character areas are in coincidence. FIG. 6C shows the manner in which a value equivalent to half the difference (Wsc1−Wdot) between width Wsc1 of the character area of the scalable font and width Wdot of the character area of the pre-rasterized font is added to the left offset of the pre-rasterized font. As a result, the center positions of the two patterns are made to coincide and a well-balance image is formed.

It should be noted that although the pre-rasterized font is drawn as being smaller than the scalable font in FIGS. 6A through 3C, position can be adjusted in similar fashion also in a case where the pre-rasterized font is larger. In such case the sign of the difference (Wsc1−Wdot) will become negative and therefore the result of the correction will be that the fonts will be situated with their center lines in agreement in a manner similar to that shown in FIG. 6C.

Figure 5:
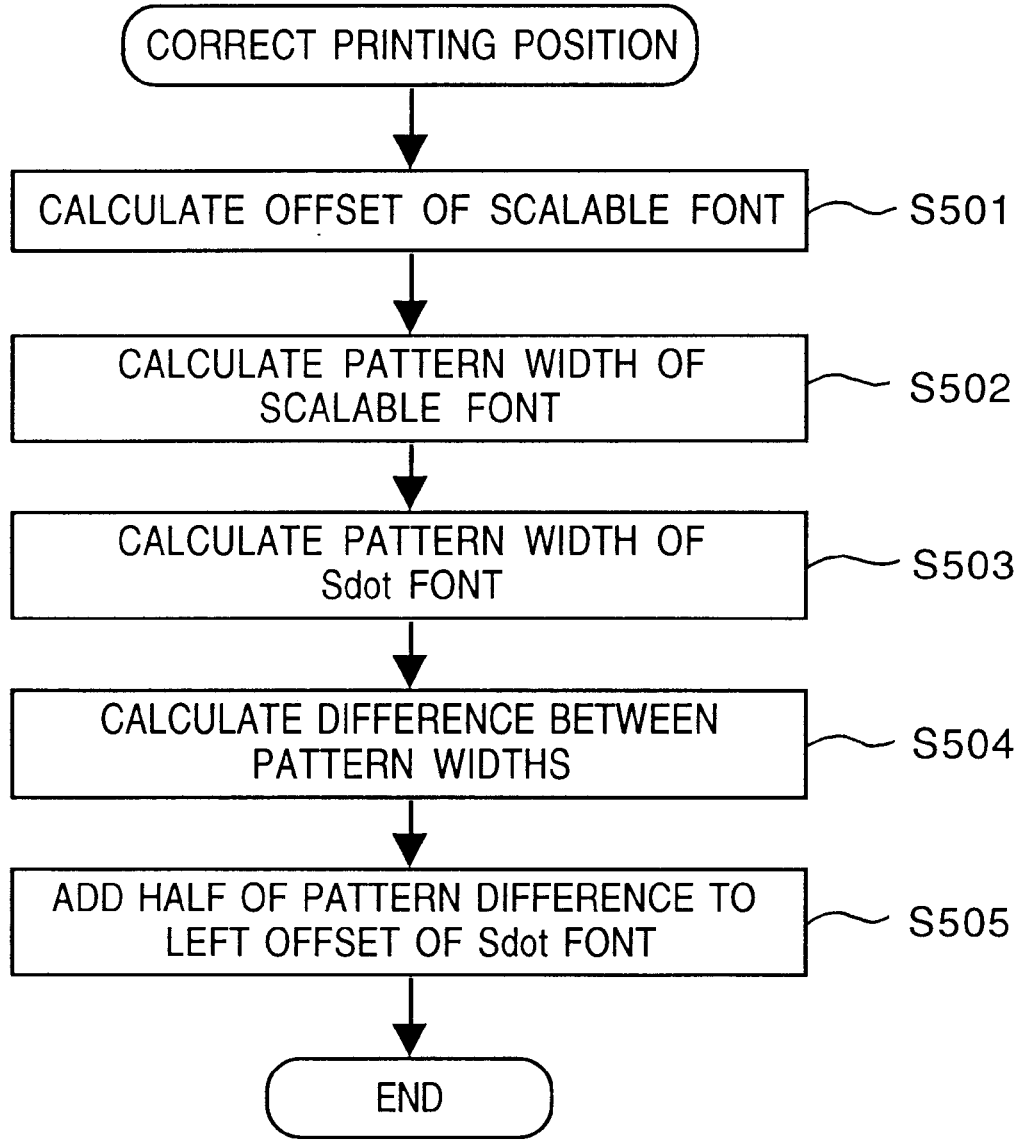
FIG. 5 is a flowchart of processing for correcting printing position according to the first embodiment.

FIG. 5 is a flowchart for describing a processing procedure executed by the Sdot position correction unit 210. This illustrates control processing for correcting the position of the Sdot font. This is a flowchart illustrating the details of step S407 in FIG. 4.

First, using a scalable font, the Sdot position correction unit 210 obtains the left offset of the character pattern whose size has been specified by the print data (S501) and the pattern width Wsc1 (S502). These can be calculated by determining the size of the character.

Next, the Sdot position correction unit 210 obtains the pattern width Wdot of the Sdot font selected at step S406 and used in printing (S503).

The Sdot position correction unit 210 then obtains the difference (Wsc1−Wdot) between the pattern width Wsc1 of the scalable font and the pattern width Wdot of the pre-rasterized font (S504).

The Sdot position correction unit 210 adds half the difference obtained at step S504, namely (Wsc1−Wdot)/2, to the left offset value of the scalable font and adopts this value as the left offset of the Sdot font (S505). In other words, the center positions of the two font patters are brought into agreement. As a result, the position of the Sdot font pattern is corrected from that shown in FIG. 6A to that shown in FIG. 6C.

Thus, the printing apparatus according to this embodiment of the invention is so adapted that when a scalable font has been specified, it is determined whether the specified size of this font falls within predetermined selection limits of the size of a pre-rasterized font already developed as a character image and, if the specified size falls within the selection limits, performs printing using this pre-rasterized font. As a result, apre-rasterized font can be utilized even if the sizes are not a perfect match, thus making it possible to speed up the development of character images.

Furthermore, since the position of the pattern of a pre-rasterized font substituting for a scalable font that was to be used originally is corrected to the position of the pattern of the scale font, the font printed out has excellent balance and it is possible to obtain a desired document which is very close to the document that would have been printed out originally.

In addition, the position of the pre-rasterized font pattern is made to coincide with the position of the scalable font that was to be used originally. Even if a character is embellished, therefore, the embellishment will not cause the character pattern to protrude from the original character area.

According to this embodiment of the invention, selection limits are set using, as a reference, the size of a pre-rasterized font that has been stored in the printing apparatus. However, an arrangement may be adopted in which the selection limits are set using a character size specified by the host computer as the reference. In such case the selection limits can be decided and stored in the printing apparatus in advance, though it may be so arranged that the selection limits are sent from the host computer to the printing apparatus as part of the print data. In this case step S405 in FIG. 4 would be modified to read "DOES SIZE OF Sdot FONT SELECTED AS CANDIDATE EXIST WITHIN SELECTION LIMITS OF SPECIFIED CHARACTER SIZE AVAILABLE?"

Further, it is set forth above that the pre-rasterized fonts are stored in the printing apparatus beforehand along with the scalable fonts. However, an arrangement may be adopted in which the pre-rasterized fonts are updated dynamically. In this case the pre-rasterized font data that has been stored in the font storage unit 209 and the font information that has been stored in the Sdot font table 208 are updated whenever a scalable font is used and the character pattern of a dot image is updated.

According to this embodiment, a laser printer is used as the printer engine. However, it is possible to use an engine of another type, such as an ink-jet printer.

Figure 14:
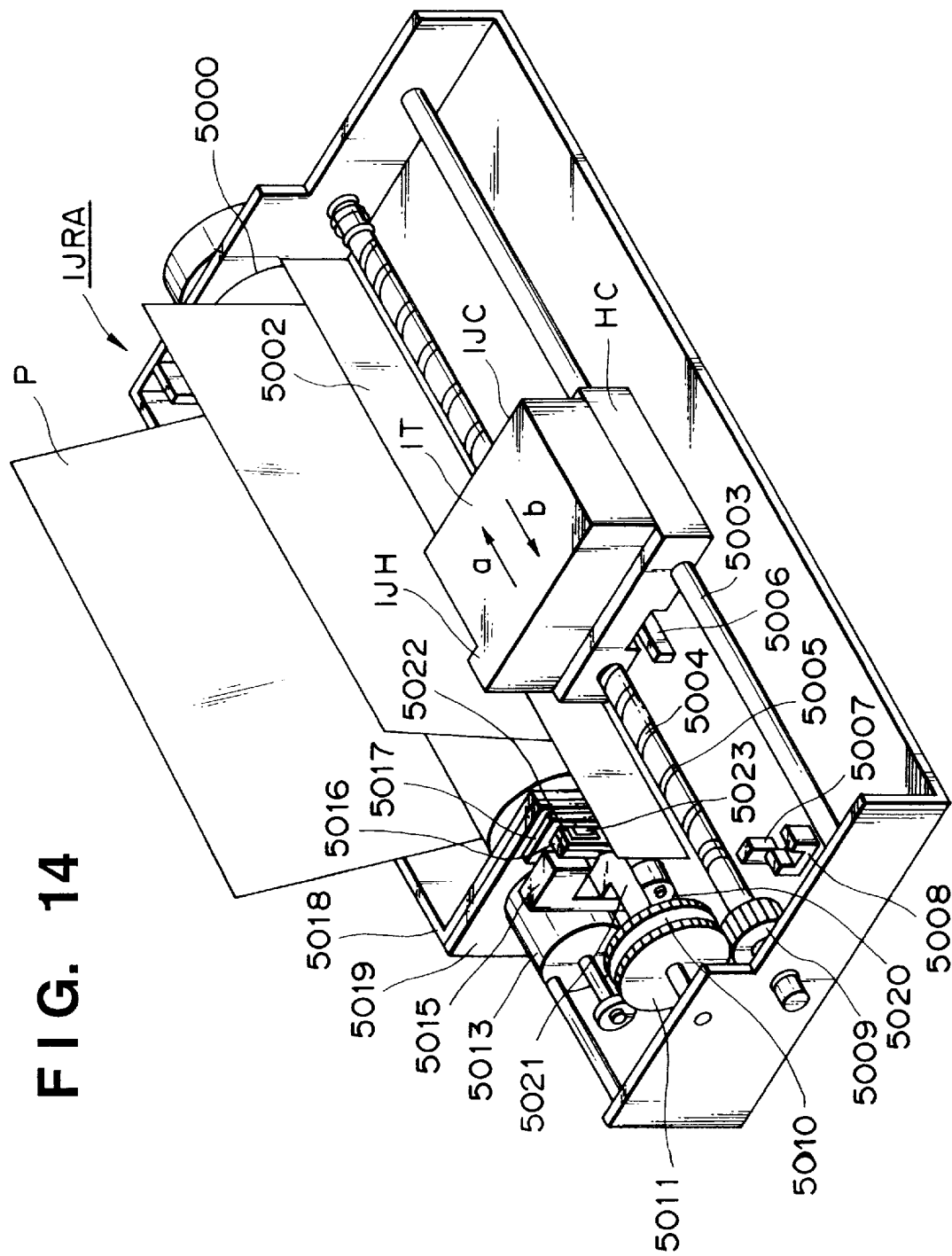
FIG. 14 is a perspective view of an ink-jet printer.

FIG. 14 is an external view showing an ink-jet recording apparatus IJRA to which the present invention can be applied.

As shown in FIG. 14, a carriage HC is engaged with a helical groove 5004 of a lead screw 5005 rotated via driving force transmission gears 5011, 5009 inoperative association with the forward and reverse rotation of a driver motor 5013. The carriage HC has a pin (not shown) moved back and forth in directions of arrows a and b. An ink-jet cartridge IJC is mounted on the carriage HC. A paper retaining plate 5002 presses recording paper P against a platen 5000 along the traveling direction of the carriage. Photocouplers 5007, 5008 constitute home position sensing means for verifying the presence of a carriage lever 5006 in the vicinity of the photocouplers and changing over the direction in which the motor 5013 is rotated. A member 5016 supports a cap member 5022, which is for capping the front side of the recording head. Suction means 5015 for applying suction to the cap subjects the cap to suction recovery via an opening 5023 inside the cap. A member 5019 makes it possible to move a cleaning blade 5017 back and forth. The cleaning blade 5017 and the member 5019 are supported on a support plate 5018. It goes without saying that the blade need not be of this type and that a well-known cleaning blade can be applied to this embodiment. A lever 5021, which is for starting the suction of the suction recovery operation, moves with movement of a cam 5020 engaged with the carriage. Movement is controlled by well-known transmission means whereby the driving force from the driver motor is changed over as by a clutch.

It is so arranged that the capping, cleaning and suction recovery operations are performed at the corresponding positions by the action of the lead screw 5005 when the carriage arrives in an area on the home-position side. However, if it is so arranged that the desired operations are performed at well-known timings, this arrangement can also be applied to this embodiment.

The ink-jet head IJH is integrated with an ink cassette. Ink filling ink passageways is heated by electro-thermal transducers (not shown) and is caused to undergo instantaneous film boiling, whereby the ink is jetted from a number of orifices. An image is formed on the recording paper by making the timing of ink jetting, the timing of scanning of the head cartridge and the timing of paper feed conform to vertical and horizontal synchronizing signals of the image signal.

[Second Embodiment]

A printing apparatus according to this embodiment is similar to that of the first embodiment is terms of the recording technique. This embodiment will be described focusing on what distinguishes it from the first embodiment. Similar elements need not be described again.

Figure 8:
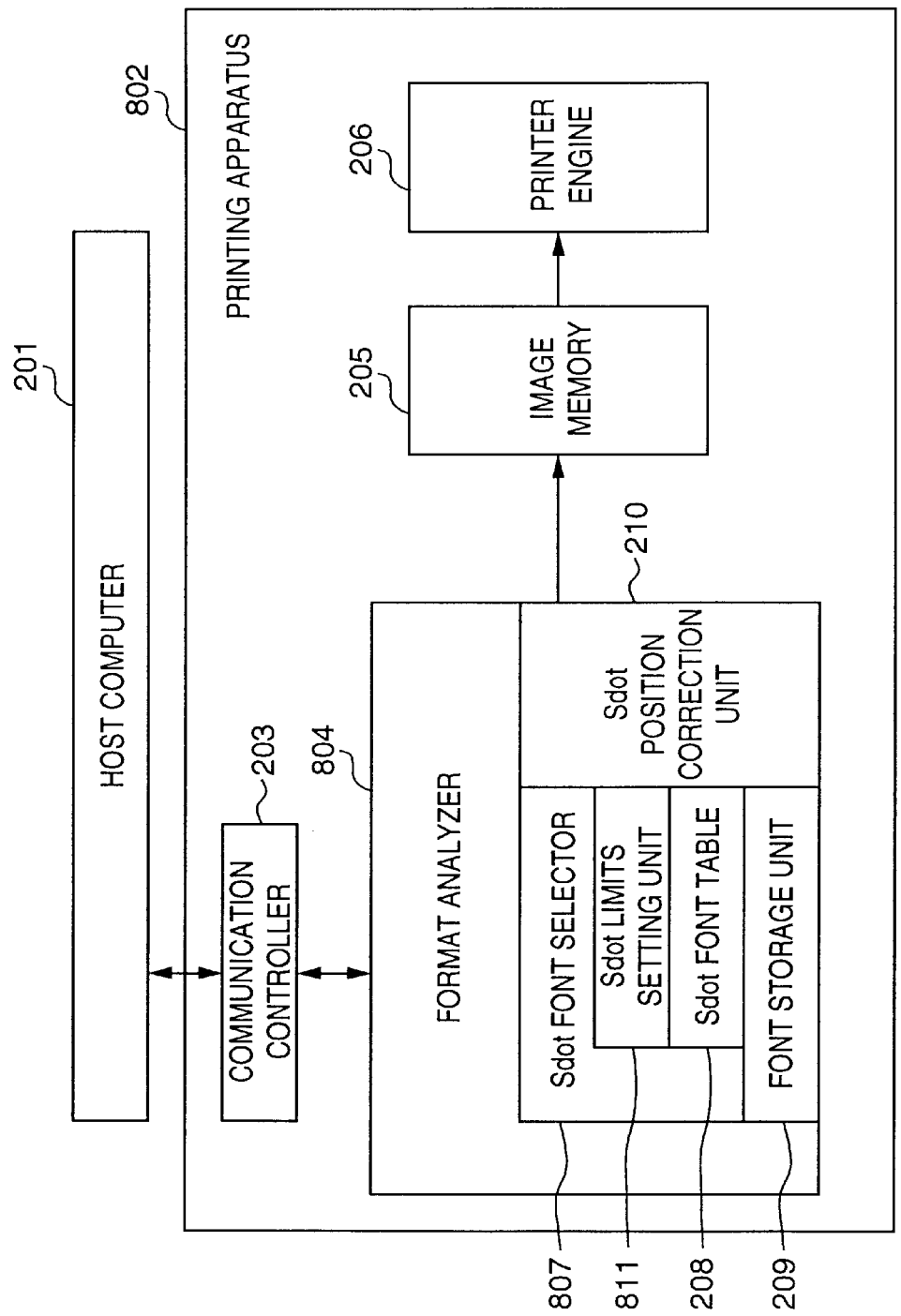
FIG. 8 is a block diagram of a printing apparatus according to a second embodiment of the present invention.

FIG. 8 is a block diagram showing a printing apparatus of this embodiment. In FIG. 8, the host computer 201 transmits printing information including print data and control data to the printing apparatus 802.

The printing apparatus 802 corresponds to the printing apparatus in FIG. 1. The printing apparatus 802 comprises the communication controller 203, a format analyzer 804, an image memory 205 and a printer engine 206.

The communication controller 203 is for performing communication with the host computer 201.

The format analyzer 804 executes processing to analyze printing information received from the host computer 201. The format analyzer 204 creates a print image in the image memory 205, whence the image is sent to the printer engine 206. The format analyzer 804 includes an Sdot font selector 807, the font storage unit 209 and the Sdot position correction unit 210. As in the first embodiment, the format analyzer 804 can have the structure shown in FIG. 13, in which case it would be implemented by having the CPU 2021 execute a program.

The image memory 205 stores the print image created by the format analyzer 804 and transfers the image to the printer engine 206.

The printer engine 206 has a printing function for forming the print image into a permanent image.

When printing is started and when a font is added on, an Sdot limits setting unit 811 retrieves a pre-rasterized font (also referred to as the "Sdot font" hereinafter), which corresponds to each scalable font, from the Sdot font table 208 and tabulates the character sizes that correspond to each of the Sdot fonts. The Sdot limits setting unit 811 obtains midpoints between the character sizes of each Sdot font registered in the table, sets the selection limits of each Sdot font and holds the resulting information in the form of a table shown in FIG. 10A. According to this embodiment, the selection limits of a pre-rasterized font are set by arranging the selection limits in the form of a table beforehand. However, an arrangement may be adopted in which the setting the selection limits is performed whenever selection limits are required. Further, according to this embodiment, the lower and upper limits of each set of the selection limits of the lower and upper extremes of the font sizes of each Sdot font are obtained by adding −0.2 and +0.2 point to the size of the Sdot font at the lower extreme and to the size of the Sdot font at the upper extreme, respectively. However, the upper and lower limits may also be decided at will.

If it has been provided by the format analyzer 804 with a character size and font name of a scalable font contained in the print data, the Sdot font selector 807 selects an Sdot font in accordance with the table created by the Sdot limits setting unit 811 and sends the selected Sdot font to the format analyzer 804. The Sdot font selector 807 includes the Sdot limits setting unit 811 and the Sdot font table 208.

The Sdot font table 208 creates a table with regard to the fonts stored in the font storage unit 209 and stores information on the fonts. Here font information indicates character attributes, such as font character size, and storage location.

The font storage unit 209 stores; the font data and is constituted by a storage medium such as a ROM, RAM, hard disk, etc.

The Sdot position correction unit 210 calculates offset of the Sdot pattern position from the Sdot font information, scalable font information and character size, corrects the offset value of the Sdot font and delivers this value to the format analyzer 804.

Figures 10A, 10B:
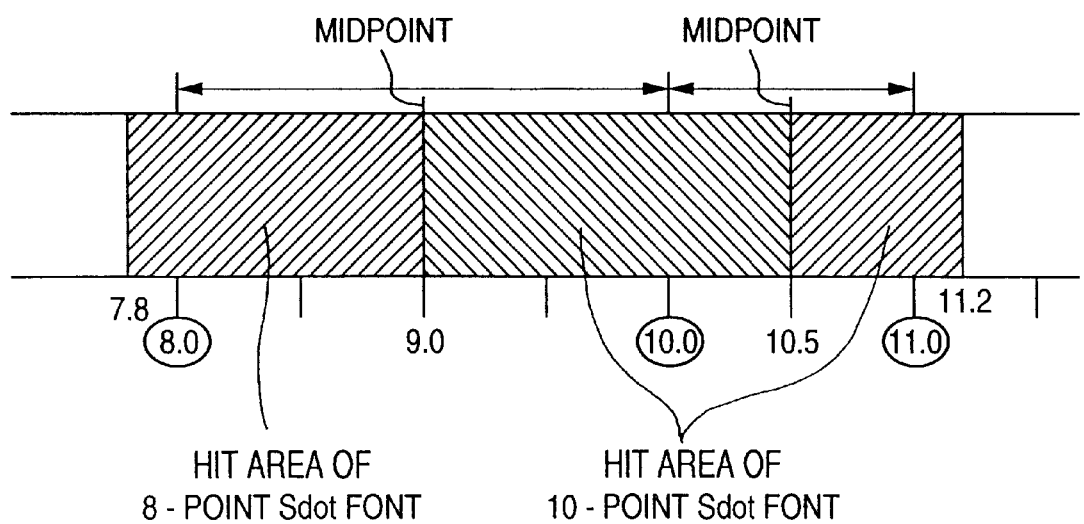
FIG. 10A is a table showing selection limits of various Sdot fonts set by an Sdot limits setting unit according to the second embodiment.
FIG. 10B is a conceptual view illustrating Sdot selection limits of a scalable font "Mincho-Medium"
Figure 11:
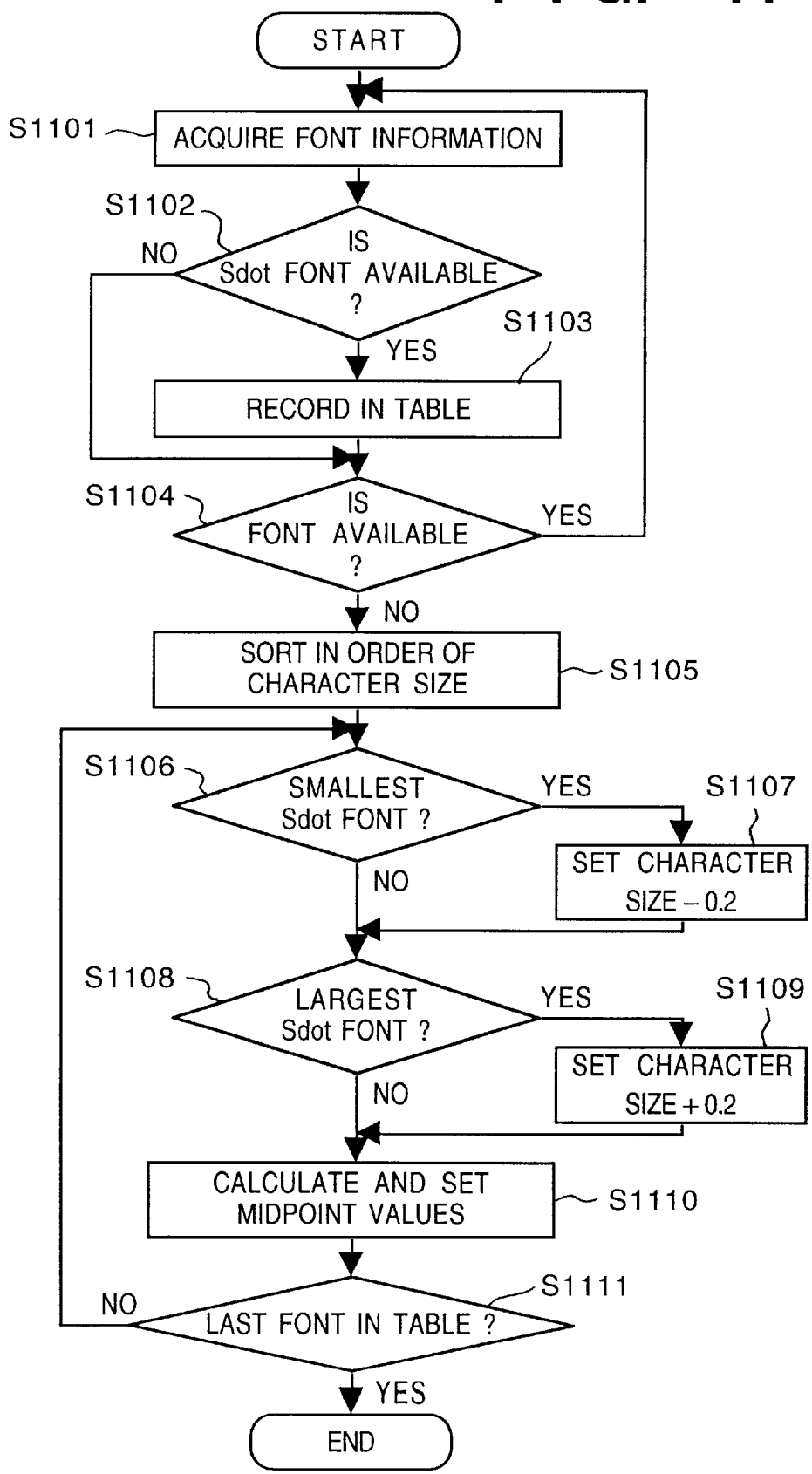
FIG. 11 is a flowchart of processing for creating a table of selection limits set by the Sdot limits setting unit according to the second embodiment.

FIG. 11 is a flowchart showing a procedure for creating the table of selection limits, shown in FIG. 10A, by the Sdot limits setting unit 811.

First, font information on each font is obtained in regular order from the Sdot font table 808 (S1101).

It is determined whether the information obtained is an Sdot font (S1102). If the information is not an Sdot font, the processing of step S1103 is skipped. If the information is an Sdot font, on the other hand, the corresponding scalable font name and its sizes are registered respectively in columns 101, 102 of the table (S1103).

The processing of steps S1101 through S1103 is repeated (S1104) until there are no longer any fonts registered in the Sdot font table 208.

If corresponding scalable font names and their sizes are thus tabulated for all of the registered pre-rasterized fonts, the Sdot fonts that have been registered in the table created at steps S1101 through S1104 are sorted in order of character size for every scalable font name (S1105).

If the character size of an Sdot font under a scalable font name is the smallest ("YES" at S1106), a character size obtained by subtracting 0.2 point from the smallest character size is set in the table as the lower limit of the selection limits of this Sdot font (S1107). In the example of FIG. 10A, the smallest size of the font name Mincho-Medium is eight points, which means that the lower limit of the selection limits for this font is 8−0.2=7.8 points. Similarly, the lower limit of the smallest size with regard to the font name Gothic-Medium is 9−0.2=8.8 points.

If the character size of an Sdot font is the largest ("YES" at S1108), a character size obtained by adding 0.2 point to the smallest character size is set in the table as the upper limit of the selection limits of this Sdot font (S1109). In the example of FIG. 10A, the largest size of the font name Mincho-Medium is 11 points, which means that the upper limit of the selection limits for this font is 11+0.2=11.2 points. Similarly, the upper limit of the largest size with regard to the font name Gothic-Medium is 10+0.2=10.2 points.

If the upper and lower limits of the selection limits have not been set through the processing of steps S1106 through S1109, then the particular font is neither of maximum nor minimum size among the Sdot fonts that belong to the scalable fonts of the same name. In regard to these fonts, therefore, the midpoint between the Sdot font of interest and a font of the same name but of one size larger is adopted as the upper limit and the midpoint between the Sdot font of interest and a font of the same name but of one size smaller is adopted as the lower limit, thereby setting the selection limits of the Sdot font of interest. This is registered in the table (S1110). The upper limit is the midpoint between this font and the font which is one size larger, and the lower limit is the midpoint between this font and the font which is one size smaller. For example, the selection limits of a 10-point font that belongs to Mincho-Medium are as follows: A point size that is one size larger than 10 points is 11 points and a point size that is one size smaller is eight points. Accordingly, the upper limit of the selection limits is 10+(11−10)/2=10.5, and the lower limit is 10−(10−8)/2=9 points.

The processing of steps S1106 through S1110 is repeated with regard to the Sdot fonts that have been registered in the table (S1111).

FIG. 10B is a diagram schematically illustrating selection limits of Mincho-Medium in FIG. 10A. In regard to Mincho-Medium, fonts of sizes 8, 10 and 11 points are registered as pre-rasterized fonts. The selection limits set are indicated by the ranges distinguished from each other by the direction of the shading in FIG. 10B. Specifically, if the specified size is a size falling in the range of 9.0 to 10.5 points, then a 10-point Sdot font is used.

Figure 9:
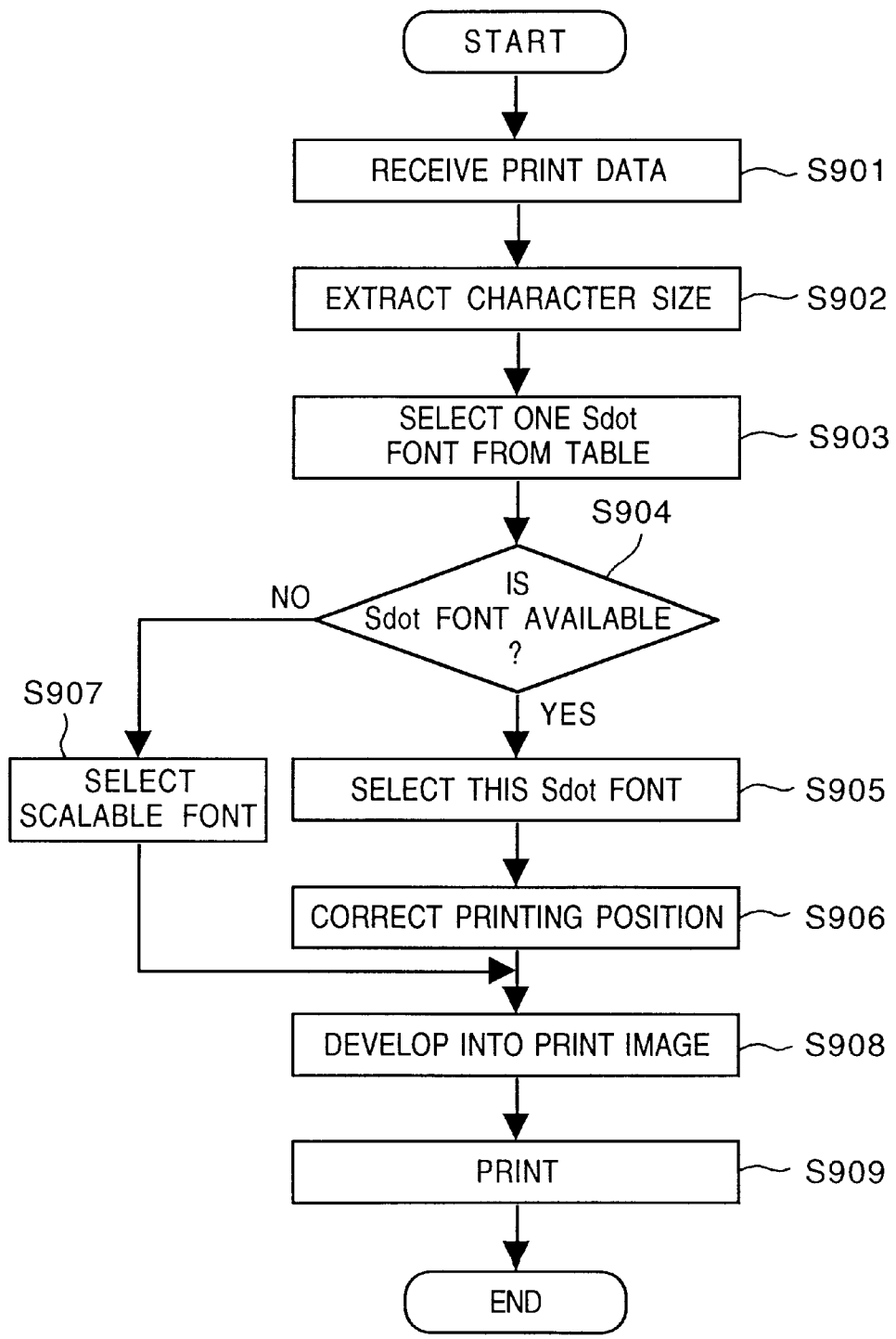
FIG. 9 is a flowchart of printing processing according to the second embodiment.

FIG. 9 is a flowchart for describing the operation of the Sdot font selector 807.

The first step in FIG. 9 is to receive the print data from the host computer (S901).

Next, the format analyzer 804 analyzes the print data accepted from the host computer. If a scalable font has been selected, the format analyzer 804 extracts the character size, and delivers it to the Sdot font selector 207 to cause retrieval of the Sdot font (S902).

The Sdot font selector 807 obtains the table, illustrated in FIG. 10A, created by the Sdot limits setting unit through the procedure of FIG. 11 and retrieves the Sdot font that corresponds to the name of the specified scalable font and the specified character size (S903).

If the corresponding Sdot font is available ("YES" at S904), then this Sdot font is delivered to the format analyzer 804 (S905).

The format analyzer 804 develops the print data into a print image using the Sdot font that has been selected. At this time the offset position is corrected by the Sdot position correction unit 810 in relation to the selected Sdot font (S906). The procedure for accomplishing this is as described in connection with FIG. 5 according to the first embodiment.

The print image is created in the image memory 805 (S908).

The printer engine 206 prints the print image that has been stored in the image memory 205 (S909).

If the pertinent Sdot font does not exist ("NO" at S904), then the scalable font specified by the print data is selected (S907).

The format analyzer 804 uses the selected scalable font to develop the print data as a print image in the image memory (S908).

The printer engine 806 prints the print image stored in the image memory 805 (S909).

Thus, the selection limits are set based upon the size of the pre-rasterized font that has, been registered. By setting the selection limits in this manner, the selection limits of pre-rasterized fonts will not be duplicated for a single font typeface. Consequently, fonts of different sizes are not used whenever the same typeface and size are specified. In addition, gaps in the selection limits are eliminated. In a case where a size between the maximum size registered with regard to a certain typeface and the upper-limit size has been specified, therefore, a pre-rasterized font is used without fail. As a result, development and printing of document images can be performed at high speed.

Furthermore, since the decision of selection limits is made again whenever a maintenance operation such as addition to or deletion from pre-rasterized fonts is carried out, the selection limits that are optimum for a registered pre-rasterized font can be set.

[Other Embodiments]

The present invention can be applied to a system constituted by a plurality of devices (e.g., a host computer, interface, reader, printer, etc.) or to an apparatus comprising a single device (e.g., a copier or facsimile machine, etc.).

Further, it goes without saying that the object of the present invention can also be achieved by providing a storage medium storing the program codes of the software for performing the aforesaid functions of the foregoing embodiments to a system or an apparatus, reading the program codes with a computer (e.g., a CPU or MPU) of the system or apparatus from the storage medium, and then executing the program.

In this case, the program codes read from the storage medium implement the novel functions of the invention, and the storage medium storing the program codes constitutes the invention.

Further, the storage medium, such as a floppy disk, hard disk, optical disk, magneto-optical disk, CD-ROM, CD-R, magnetic tape, non-volatile type memory card or ROM can be used to provide the program codes.

Furthermore, besides the case where the aforesaid functions according to the embodiments are implemented by executing the program codes read by a computer, the present invention covers a case where an operating system or the like working on the computer performs a part of or the entire process in accordance with the designation of program codes and implements the functions according to the embodiment.

Furthermore, the present invention further covers a case where, after the program codes read from the storage medium are written in a function extension board inserted into the computer or in a memory provided in a function extension unit connected to the computer, a CPU or the like contained in the function extension board or function extension unit performs a part of or the entire process in accordance with the designation of program codes and implements the function of the above embodiments.

Thus, in accordance with the present invention, as described above, it is so arranged that even if there is no pre-rasterized font that coincides with a specified size, a pre-rasterized font of a size close to the specified size can be used, thereby speeding up printing processing.

Further, in a case where use is made of a pre-rasterized font whose size is not the specified size, the position of the character is corrected by performing correction of the printing position. This makes it possible to carry out printing of characters having good balance.

Further, the selection limits of a pre-rasterized font can be decided dynamically and selected ranges can be connected. This raises the efficiency with which pre-rasterized fonts are used and makes it possible to perform high-speed printing. Even if pre-rasterized fonts having character sizes adjacent to each other are used, overlapping of select limits does not occur.

As many apparently widely different embodiments of the present invention can be made without departing from the spirit and scope thereof, it is to be understood that the invention is not limited to the specific embodiments thereof except as defined in the appended claims.

What is claimed is:

1. A character processing apparatus comprising:
   development means for developing a character into an output image, said development means developing based upon an offset value which defines a distance from a character reference position to a specific position in the character;
   selection means for selecting a first dot font in a case where the character to be developed has a size within a range; and
   correction means for acquiring a correction value based upon a width of the character to be developed based on a width of the first dot font selected by said selection means and for correcting the offset value used by said developing means using the correction value.

2. An apparatus according to claim 1, wherein the correction value is a half of a difference between a width of the character to be developed and a width of the first dot font selected by said selection means.

3. An apparatus according to claim 1, wherein said correction means corrects the offset value by adding the correction value of the offset value.

4. An apparatus according to claim 1, wherein said selection means selects the first dot font in a case where a character to be outputted ranges from a first mid-size between the size of the first dot font and a next smaller size, to a second mid-size between the size of the first dot font and a next larger size.

5. An apparatus according to claim 1, wherein the offset value includes a vertical component and a horizontal component.

6. An apparatus according to claim 1, wherein if the first dot font is smaller than the character to be output, then said correction means corrects the offset values so as to shift the first dot font toward a following character of the first dot font, while if the first dot font is larger than the character to be output, said correction means corrects the offset value so as to shift the first dot font toward a preceding character of the first dot font.

7. An apparatus according to claim 1, further comprising output means for outputting the output image developed by said development means.

8. An apparatus according to claim 7, wherein said output means is an inkjet printer.

9. An apparatus according to claim 7, wherein said output means is a laser beam printer.

10. A character processing method comprising:
    developing a character into an output image, said development step developing based upon an offset value which defines a distance from a character reference position to a specific position in the character;
    selecting a first dot font in a case where the character to be developed has a size within a range;
    acquiring a correction value based upon a width of the character to be developed based on a width of the first dot font selected by said selecting step; and
    correcting the offset value used by said developing step using the correction value.

11. A method according to claim 10, wherein the correction value is a half of a difference between a width of the character to be developed and a width of the first dot font selected by said selection step.

12. A method according to claim 10, wherein said correction step corrects the offset value by adding the correction value of the offset value.

13. A method according to claim 10, wherein said selection step selects the first dot font in a case where a character to be outputted ranges from a first mid-size between the size of the first dot font and a next smaller size, to a second mid-size between the size of the first dot font and a next larger size.

14. A method according to claim 10, wherein the offset value includes a vertical component and a horizontal component.

15. A method according to claim 10, wherein if the first dot font is smaller than the character to be output, then said correction step corrects the offset values so as to shift the first dot font toward a following character of the first dot font, while if the first dot font is larger than the character to be output, said correction step corrects the offset value so as to shift the first dot font toward a preceding character of the first dot font.

16. A method according to claim 10, further comprising an output step for outputting the output image developed by said development means.

17. A method according to claim 16, wherein said output step is to an inkjet printer.

18. A method according to claim 16, wherein said output step is to a laser beam printer.

19. A computer readable memory medium for storing computer executable process steps that process a character, the computer executable process steps including:
    a development step to develop a character into an output image, said development step developing based upon an offset value which defines a distance from a character reference position to a specific position in the character;

a selection step to select a first dot font in a case where the character to be developed has a size within a range; and an acquiring step to acquire a correction value based upon a width of the character to be developed based on a width of the first dot font selected by said selecting step; and a correction step to correct the offset value used by said developing step using the correction value.

20. A medium according to claim 19, wherein the correction value is a half of a difference between a width of the character to be developed and a width of the first dot font selected by said selection step.

21. A medium according to claim 19, wherein said correction step corrects the offset value by adding the correction value of the offset value.

22. A medium according to claim 19, wherein said selection step selects the first dot font in a case where a character to be outputted ranges from a first mid-size between the size of the first dot font and a next smaller size, to a second mid-size between the size of the first dot font and a next larger size.

23. A medium according to claim 19, wherein the offset value includes a vertical component and a horizontal component.

24. A medium according to claim 19, wherein if the first dot font is smaller than the character to be output, then said correction step corrects the offset values so as to shift the first dot font toward a following character of the first dot font, while if the first dot font is larger than the character to be output, said correction step corrects the offset value so as to shift the first dot font toward a preceding character of the first dot font.

25. A medium according to claim 19, further comprising an output step to output the output image developed by said development means.

26. A medium according to claim 25, wherein said output step outputs to an inkjet printer.

27. A medium according to claim 25, wherein said output step outputs to a laser beam printer.

* * * * *

UNITED STATES PATENT AND TRADEMARK OFFICE
CERTIFICATE OF CORRECTION

PATENT NO. : 6,055,061
DATED : April 25, 2000
INVENTOR : Yukimasa Sato

It is certified that error appears in the above-identified patent and that said Letters Patent is hereby corrected as shown below:

COLUMN 5

Line 24, "(S4005)" should read --(S405)--.

COLUMN 6

Line 37, "apre-rasterised" should read --a pre-rasterised--.

COLUMN 7

Line 15, "inoperative" should read --in operative--.

COLUMN 8

Line 27, "sets·the" should read --sets the--;
Line 52, "stores;" should read --stores--.

UNITED STATES PATENT AND TRADEMARK OFFICE
CERTIFICATE OF CORRECTION

PATENT NO. : 6,055,061

DATED : April 25, 2000

INVENTOR : Yukimasa Sato

It is certified that error appears in the above-identified patent and that said Letters Patent is hereby corrected as shown below:

COLUMN 10

Line 33, "has," should read --has--.

Signed and Sealed this

Seventeenth Day of April, 2001

Attest:

NICHOLAS P. GODICI

Attesting Officer

Acting Director of the United States Patent and Trademark Office